United States Patent
Lewis et al.

(10) Patent No.: US 7,414,723 B2
(45) Date of Patent: Aug. 19, 2008

(54) AUTOMATED INTERLEAVED SPECTRAL IMAGING CALIBRATION

(75) Inventors: E. Neil Lewis, Brookeville, MD (US); Joseph William Schoppelrei, Crofton, MD (US); Eunah Lee, Olney, MD (US)

(73) Assignee: Malvern Instruments Incorporated, Southborough, MA (US)

( * ) Notice: Subject to any disclaimer, the term of this patent is extended or adjusted under 35 U.S.C. 154(b) by 11 days.

(21) Appl. No.: 11/063,051

(22) Filed: Feb. 22, 2005

(65) Prior Publication Data
US 2006/0017922 A1    Jan. 26, 2006

Related U.S. Application Data

(60) Provisional application No. 60/547,014, filed on Feb. 23, 2004.

(51) Int. Cl.
*G01J 3/46*    (2006.01)
(52) U.S. Cl. ...................................................... 356/402
(58) Field of Classification Search ................ 356/326, 356/300, 243.1, 243, 243.5, 243.8, 244, 294, 356/402–425, 301; 355/53, 55
See application file for complete search history.

(56) References Cited

U.S. PATENT DOCUMENTS

| | | | | |
|---|---|---|---|---|
| 4,832,487 A | * | 5/1989 | Mikuriya et al. | 356/243.1 |
| 5,303,165 A | * | 4/1994 | Ganz et al. | 356/319 |
| 5,825,483 A | * | 10/1998 | Michael et al. | 356/243.1 |
| 6,337,472 B1 | | 1/2002 | Garner et al. | |
| 6,594,008 B1 | * | 7/2003 | Herpst et al. | 356/243.1 |
| 6,621,574 B1 | * | 9/2003 | Forney et al. | 356/301 |
| 2002/0168784 A1 | | 11/2002 | Sundrehagen et al. | |
| 2006/0257866 A1 | * | 11/2006 | Welch et al. | 435/6 |
| 2006/0257886 A1 | * | 11/2006 | Welch et al. | 435/6 |

* cited by examiner

*Primary Examiner*—Tarifur R Chowdhury
*Assistant Examiner*—Jonathon D Cook
(74) *Attorney, Agent, or Firm*—Kristofer E. Elbing

(57) ABSTRACT

An imaging spectrometric instrument is disclosed. This instrument can include an imaging detector and one or more calibration standards having different optical properties. Portions of one or more actuators can move the calibration standards between the imaging detector and a sample. This instrument can use the actuator(s) to acquire an image of a sample and measure light and dark reference calibration values in quick succession at a given wavelength, before the instrument is tuned to another wavelength.

27 Claims, 3 Drawing Sheets

AUTOMATED INTERLEAVED SPECTRAL IMAGING CALIBRATION

CROSS-REFERENCE TO RELATED APPLICATION

This application claims the benefit under 35 U.S.C. 119(e) of a U.S. provisional application entitled "SPECTRAL IMAGING CALIBRATION," Ser. No. 60/547,014, filed on Feb. 23, 2004, which is herein incorporated by reference.

BACKGROUND OF THE INVENTION

One method of constructing a hyperspectral imaging instrument is to incorporate a tunable filter in front of a generic two-dimensional detector array such as an infrared focal plane array (FPA), or a detector array responsive to visible or ultraviolet light such as a CCD detector. In FIG. 1 a liquid crystal tunable filter (LCTF) is used which is especially well suited for this purpose, since it allows very narrow wavelength selection (bandpass) over a wide and continuous range, in the visible or near-infrared (NIR) region of the light spectrum. However, this concept is equally applicable for other tunable filters such as AOTFs or interferometers typically used for hyperspectral imaging instrumentation.

In this case, the system is used to measure the NIR light absorbed by a sample at one or more wavelengths. To make such a measurement, it is generally necessary to compare (ratio) the sample response (IS) to the background response (IB) of a non-absorbing reference material ("bright" reference). This removes the contributions arising from the optical properties of the imaging system (illumination source, magnification optics, LCTF, and the FPA), usually referred to as the instrument function. Therefore the sample absorbance (A) is measured as:

$$A_S = -\mathrm{Log}(I_S/I_B) \quad \text{[equation 1]}$$

It has been shown that the accuracy of the absorbance measurement for the sample can be further improved through the subtraction of the stray light signal ($I_D$) which may contribute significant noise to the measurement. The stray light signal is typically measured from a "dark" reference such as a mirror placed significantly out of the focus of the instrument. Incorporating the stray light correction into the measurement, equation 1 becomes:

$$A_S = -\mathrm{Log}((I_S - I_D)/(I_B - I_D)) \quad \text{[equation 2]}$$

The prior art process for collecting data from a sample using the system has been as follows: a sample is placed at the focus of the instrument. The LCTF is tuned to the first desired wavelength and the FPA response is recorded. The LCTF is then tuned to the next desired wavelength and the next FPA response is recorded. This process is repeated for each of the desired wavelengths, and, when completed, the sample data set is stored. Next the sample is removed and replaced with the background reference. The entire process is repeated so that the FPA response at the same wavelength set is collected and stored for the reference. If the stray light correction is to be performed, the background reference is replaced with the "dark" reference, and a third data set is collected in the same stepwise fashion. The order of collection of the three data sets—sample, background, and stray light—is unimportant, each must be completed before the mathematical corrections (either equation 1 or 2) are performed yielding the true absorption response of the sample.

SUMMARY OF THE INVENTION

The invention relates to the calibration of imaging spectrometric instruments, which involves the use of calibration standards that can be placed in the field of view of the instrument, such as by an actuator. In another general aspect, acquisition of images at different wavelengths is interleaved with calibration operations to achieve a calibrated hyperspectral data set.

The invention can address the problem that a significant source of spectral artifacts for an experiment conducted in the prior art manner, described above, arises from changes in the instrument response over time. A typical spectrum may include over 100 discrete wavelength measurements, and thus the acquisition of $I_S$, $I_B$, and $I_D$ for a particular wavelength may be separated by several minutes, or more. In practice, illumination sources, focal plane array detectors, and tunable filters or interferometers are known to exhibit temporal variations, which can be exacerbated by small changes in ambient temperature. The drift results in differences in the instrument function portion of $I_S$ and $I_B$ producing a non-random noise contribution to $A_S$. Since this noise is non-random in nature, standard noise reduction techniques such as scan-averaging do not work, and actually amplify the noise contribution of the drift.

In one general aspect, the invention features a calibration standard assembly for an imaging spectrometric instrument that includes a first calibration standard having a first set of optical properties. A first actuator portion is operatively connected to the first calibration standard and is operative to move the first calibration standard in and out of a field of view of the imaging spectrometric instrument.

In preferred embodiments, the assembly can further include a second calibration standard having a second set of optical properties different from the first set of optical properties, and a second actuator portion operatively connected to the second calibration standard and operative to move the second calibration standard in and out of a field of view of the spectrometric instrument. The assembly can further include a support element to which the first and second calibration standards are connected, with the first and second actuator portions being part of a common actuator that is operative to move the support element. The support element can bear the first and second calibration standards at different radial positions about an axis of rotation, with the actuator being a motor operative to rotate the support element about the axis of rotation. The support element can bear the first and second calibration standards at different linear positions along a first translation direction, with the actuator being a linear actuator operative to move the support element along the first translation direction. The support element can further include an opening, with the actuator being operative to move the opening into the field of view of the imaging spectrometric instrument. The assembly can further include a removable coupling mechanism between the support element and the actuator to allow for replacement of the support element with further, different support elements. The assembly can further include a machine-readable identifier on the support element, the first calibration standard, or the second calibration standard. The first calibration standard can be a bright reference, with the second calibration standard being a dark reference. The first actuator portion can be operative independent of any movement of a sample in the field of view of the imaging spectrometric instrument. The assembly can further include a further actuator portion operatively connected to a multi-sample holding element.

In another general aspect, the invention features an imaging spectrometric instrument that includes an imaging detector and a first calibration standard having a first set of optical properties. A first actuator portion is operatively connected to the first calibration standard and is operative to move the first calibration standard between the imaging detector and a sample.

In preferred embodiments, the imaging detector can be a detector that is sensitive to infrared wavelengths. In preferred embodiments, the imaging detector can be a detector that is sensitive to visible wavelengths. In preferred embodiments, the imaging detector can be a detector that is sensitive to ultraviolet wavelengths.

In a further general aspect, the invention features a calibration method for an imaging spectrometric instrument that includes acquiring a first image of a sample at a first wavelength, and moving a first calibration standard between the sample and an imaging sensor of the instrument after the step of acquiring the first image. Calibration data is then acquired from the first calibration standard, and the calibration standard is moved out from between the sample and the imaging sensor. A second image of the sample is then acquired at a second wavelength, and a calibrated hyperspectral data set is generated for the sample from the steps of acquiring a first image, acquiring calibration data, and acquiring a second image.

In preferred embodiments, the method can further include an initial calibration step before the step of acquiring a first image of the sample. The method can further include a further interleaved succession of steps of acquiring images and acquiring calibration data for the sample, with the step of generating a calibrated hyperspectral data set for the sample from the steps of acquiring a first image, acquiring calibration data, acquiring a second image, and the further interleaved succession of steps. The method can further include the steps of moving a second calibration standard between the sample and the imaging sensor of the instrument after the step of acquiring the first image, and acquiring calibration data from the second calibration standard after the step of moving the second calibration standard between the sample and the imaging sensor. The steps of moving, acquiring, and generating can take place independent of any movement of the sample.

In another general aspect, the invention features a calibration standard assembly for an imaging spectrometric instrument that includes first calibration means having a first set of optical properties, and means for moving the first calibration means in and out of a field of view of the imaging spectrometric instrument.

DETAILED DESCRIPTION OF AN ILLUSTRATIVE EMBODIMENT

Figure 1:
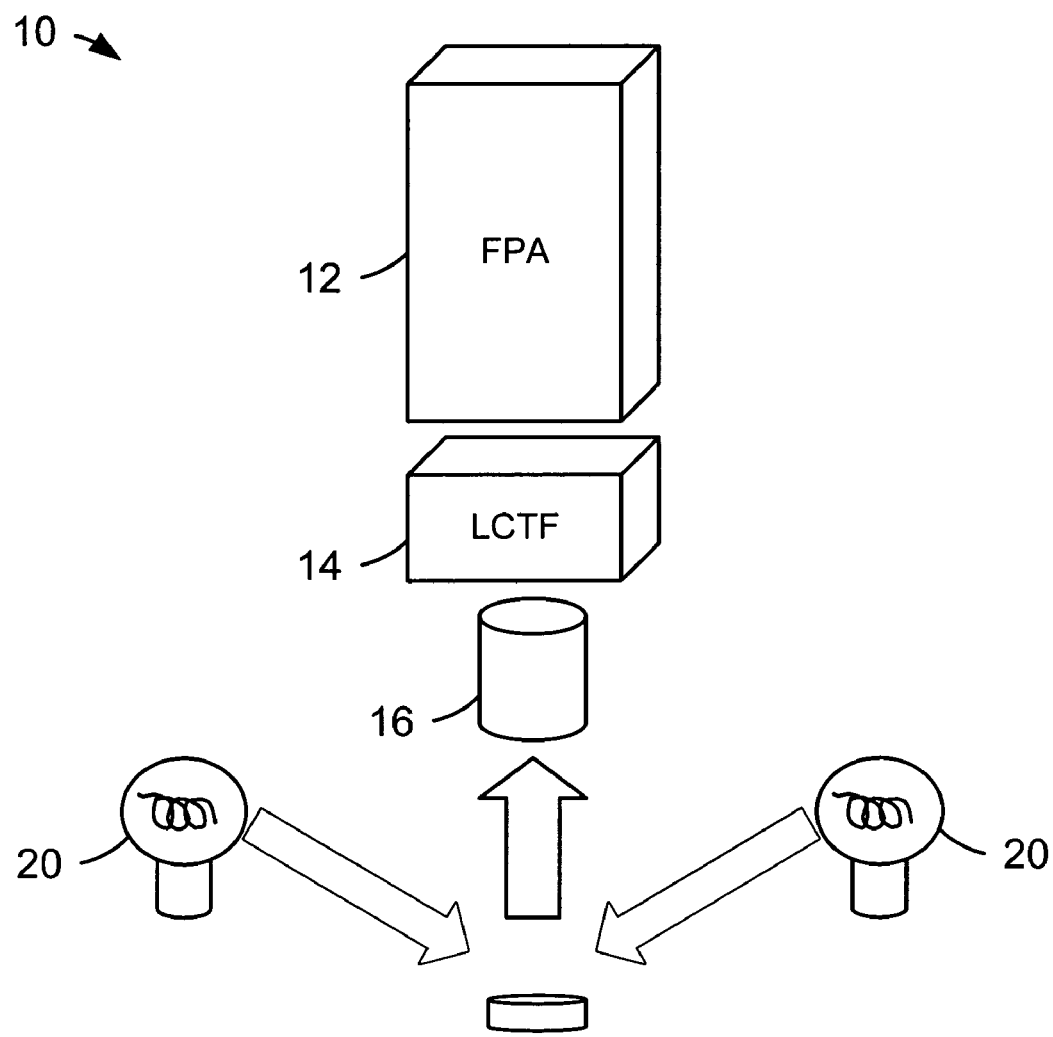
FIG. 1 is a basic schematic of a configuration of a prior art hyperspectral imaging instrument incorporating a tunable filter device (LCTF) for wavelength selection.

A proposed illustrative embodiment operates according to a different collection scheme, and will minimize the effects of instrumental variations, such as drift, and greatly improve the performance of the imaging system 10 shown in FIG. 1. This scheme has two parts. The first is a hardware device that will allow the system to rapidly switch between a sample, background reference, and dark reference without disturbing the position of the sample. The second is a different data acquisition procedure that involves measuring $I_S$, $I_B$, and $I_D$ in quick succession at a given wavelength before the filter is tuned to the next wavelength.

Figure 2A:
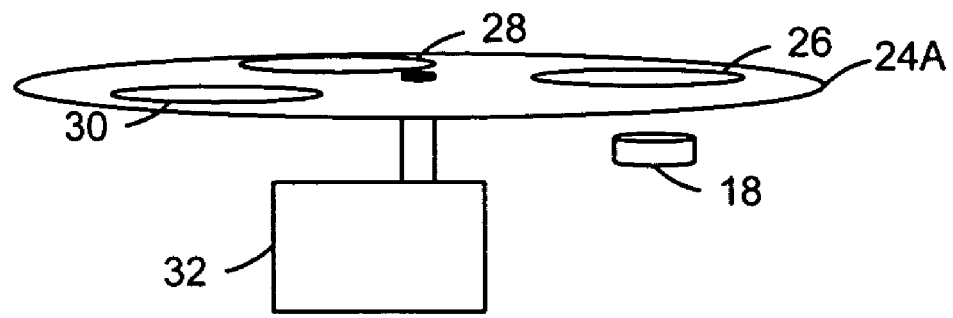
FIG. 2A is a side view schematic of a rotating circular configuration for an automated reference switching device according to one embodiment of the invention.
Figure 2B:
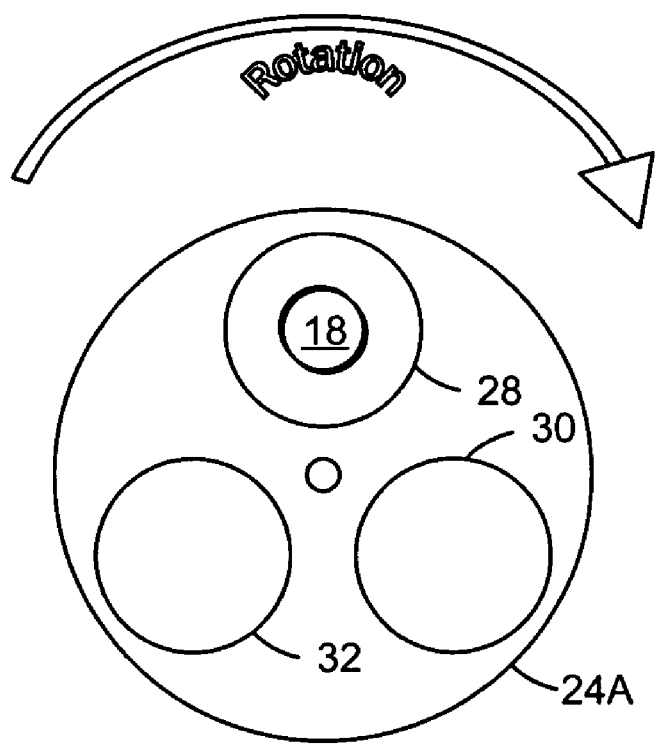
FIG. 2B is a top view schematic of the automated reference switching device of FIG. 2A.
Figure 3A:
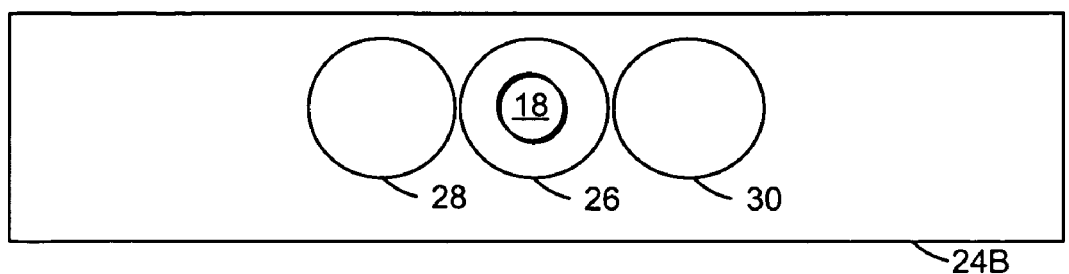
FIG. 3A is a top view schematic of a linear slider configuration for an automated reference switching device according to another embodiment of the invention.
Figure 3B:
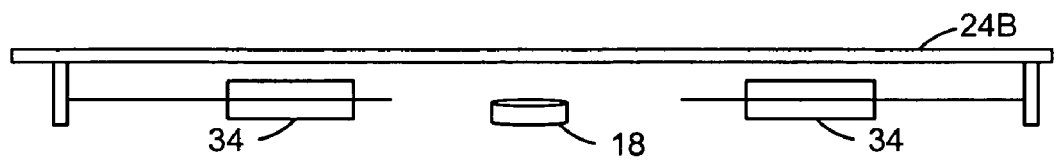
FIG. 3B is a side view of the automated reference switching device of FIG. 3A.
Figure 3C:
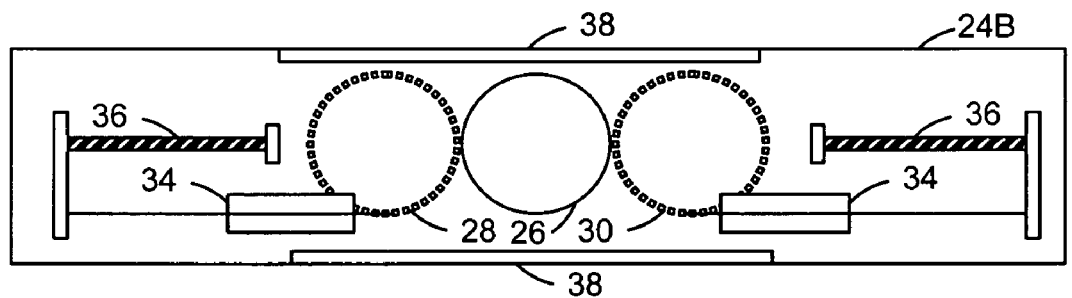
FIG. 3C is a bottom view of the automated reference switching device of FIG. 3A.

Referring to FIGS. 1-3, the proposed hardware device consists of a small, motorized stage 24 that can be mounted slightly above the sample 18 to be measured (e.g., below a Focal Plane Array (FPA) 12, a Liquid Crystal Tunable Filter (LCTF) 14, and an optic, such as an imaging optic 16. The stage would have three (or more) positions, one of which would be an open hole 26 through which the sample can be imaged. One of the other positions would contain a background reference material 28 (e.g. Spectralon® or a piece of white ceramic) and another would contain a mirror or some other material to act as a "dark" reference 30. The stage position would be automatically controlled through the instrument software. Illumination sources 20 would illuminate the sample.

Two notable configurations for this device are presented in this document. One in which the stage 24A is a circular plate, mounted to a stepping or dc motor 32 by a shaft perpendicular to its center (see FIG. 2). The stage would simply rotate into each of the positions as necessary. In the other configuration, the stage would be a rectangular plate 24B with the sample positions aligned in a linear arrangement (See FIG. 3). The plate would be permitted to slide along the axis of the sample positions, such as on a rail slider support assembly 38, and would be powered by solenoid actuators 34. Springs 36 would hold the stage in a neutral orientation at the center sample position, which would be the open hole.

Using one of these devices the data collection procedure would be as follows: The LCTF 14 would be tuned to a desired wavelength, and then the FPA 12 response from the current device positions (e.g. "sample") would be recorded. The hardware device would then move to another position (e.g. "bright reference") and the FPA response from that position would be recorded. The device would then move to the third position (e.g. "dark" reference) and the FPA response from the third position would be recorded. The device would then move to the original position (e.g. sample) while the LCTF was being tuned to the next desired wavelength. At each desired wavelength the procedure would be repeated until the desired wavelength range had been scanned. The mathematical correction for the sample absorbance (either equation 1 or 2) can be performed "on the fly" at each wavelength resulting in the final output being the corrected spectrum. Or, if desired, the individual position responses could be stored separately permitting preservation of the "raw" data. In this case the corrections (equation 1 or 2) could be applied after the completion of the experiment.

Preliminary experiments using this new scheme have revealed several distinct advantages. First, since there is very little time separating the collection of $I_S$, $I_B$, and $I_D$ instrumental drift effects are essentially eliminated. This results in a significant improvement in the signal to noise performance of the instrument as compared to the "typical" or "traditional" collection scheme outlined earlier. Furthermore, the noise component that remains (likely detector and source noise) is random in nature. This was demonstrated in experiments in which multiple scans collected by the new scheme were averaged. The resulting increase in signal to noise approached the theoretical limit given by the equation:

$$\text{Signal/Noise} \propto (\text{number of scans})^{1/2} \qquad [\text{equation 3}]$$

Therefore, using the new scheme, it is now more possible to "tailor" the experiment to balance the time required for the collection with the sensitivity required for the measurement. And, since extremely high sensitivities are achievable, the applicability of the hyperspectral imaging technique can be widened to a host of difficult experiments that were once out of reach.

Another advantage that became apparent was greatly improved high spectral resolution performance. Using the "traditional" collection scheme, the temporal instability of the tunable filter has the effect of potentially imposing artifacts into the corrected spectrum, even when the wavelength interval is somewhat larger than the bandpass specified by the filter. In the new collection scheme, this effect is eliminated, no matter what wavelength interval is chosen. Experiments with the new collection have demonstrated that resolution is only limited by the filter bandpass characteristics and no artifacts appear in the corrected data.

The new collection technique also offers greater efficiency. The most time consuming part of the collection procedure is the repetitive tuning of the filter. In the traditional scheme, this process must be repeated three times for each desired wavelength, in order to collect $I_S$, $I_B$, and $I_D$ in successive runs. In the new scheme, only one tuning procedure is necessary to acquire all three responses. While some time is necessary to move the automated device to each of the positions, the net collection time is still significantly reduced over that required by "traditional" method. Furthermore, with the new scheme, the instrument operator is no longer obligated to replace the sample or reference between runs. Therefore the new, automated collection scheme is both less labor-intensive and less susceptible to operator errors.

Another advantage that could be realized by the proposed automated device is that it could be used to further automate the imaging instrument. The stage plate in either version of the device could be made to be exchangeable by the user. In this case additional stages fitted with calibrated performance standards such as grey-bodies or neutral density filters could be fitted to conduct automated instrument performance verification. The instrument could also be fitted with one or more sample actuation units, such as a series of stacked sample wheels capable of carrying 20 or more samples each, in place of a fixed sample support. This would allow the instrument to automatically acquire spectral information for these samples in succession. This type of operation can be accomplished using sequencing software or hardware to control a calibration wheel above an X-Y stage that supports multiple samples. Suitable X-Y stages are available, for example, from Prior Scientific, Inc., of Rockland, Mass.

It should be noted that it is generally preferable to insert the standards close to the sample, so that errors introduced by all parts of the instrument, such as intervening objective optics between its sensor and the sample, are taken into account. It should also be noted that placing the standards at a slightly out-of-focus position may actually yield better calibration results due to a spatial low-pass filtering effect.

Other types of calibration can be performed using a calibration apparatus according to the invention. So-called "grey" standards can be used to calibrate the instrument's linearity. Filters can be used to calibrate wavelength accuracy. Other filters can be used to measure noise performance. And these operations can take place daily and potentially automatically, at the beginning of each acquisition set, and/or within the acquisition of an image to ensure that the current instrument performance meets specifications. It is also possible for some applications to create a compound standard that can place two or more different types of standards in the field of view of the instrument.

The subject matter of this application can be combined with the teachings of three previous applications: "Spectrometric Process Monitoring," Ser. No. 10/328,713, filed on Dec. 23 2002, "Volumetric Spectral Imaging," Ser. No. 10/684,965, filed on Oct. 14, 2003, and "Imaging Spectrometer," Ser. No. 10/611,668, filed on Jul. 1, 2003. It may also be combined with the subject matter of two previous applications entitled "Hybrid-Scanning Spectrometer" Ser. Nos. 09/817,785, and 09/828,281, filed on Mar. 26, 2001 and Apr. 6, 2001, respectively. The systems described in this application can also be used to examine a series of pharmaceutical dosage units, such as capsules, tablets, pellets, ampoules, or vials, or otherwise combined with the teachings described in applications entitled "High-Volume On-Line Spectroscopic Composition Testing of Manufactured Pharmaceutical Dosage Units," including application Ser. No. 09/507,293, filed on Feb. 18, 2000, application Ser. No. 60/120,859, filed on Feb. 19, 1999, and application Ser. No. 60/143,801, filed on Jul. 14, 1999 (PCT/US00/19271 and PCT/US00/19273). The concepts presented in this application can also be combined with subject matter described in applications entitled "High-Throughput Infrared Spectrometry," including application Ser. No. 09/353,325, filed Jul. 14, 1999, application Ser. No. 60/092,769 filed on Jul. 14, 1998, and application Ser. No. 60/095,800 filed on Aug. 7, 1998 (PCT/US99/15900), as well as applications entitled "Multi-Source Array," including application Ser. No. 60/183,663, filed on Feb. 18, 2000, and application Ser. No. 09/788,316, filed on Feb. 16, 2001 (PCT/US01/05262). All of the applications listed in this paragraph are herein incorporated by reference.

The present invention has now been described in connection with a number of specific embodiments thereof. However, numerous modifications which are contemplated as falling within the scope of the present invention should now be apparent to those skilled in the art. For example, one of ordinary skill could easily devise numerous other types of mechanisms to move the references, such as mechanisms that employ cogs, cams, or cranks. Therefore, it is intended that the scope of the present invention be limited only by the scope of the claims appended hereto. In addition, the order of presentation of the claims should not be construed to limit the scope of any particular term in the claims.

What is claimed is:

1. A calibration standard assembly for an imaging spectrometric instrument that includes an imaging sensor based on a two-dimensional array of detector elements, comprising:
   a first calibration standard having a first set of optical properties,
   a first actuator portion operatively connected to the first calibration standard and operative to move the first calibration standard in and out of a field of view of the imaging spectrometric instrument,
   sequencing means including means for performing steps of each automatically acquiring an image using the image sensor, automatically moving the first calibration standard using the first actuator portion, and automatically acquiring calibration data from the first calibration standard using the image sensor for a first wavelength, wherein the sequencing means also includes means for repeating the steps of automatically acquiring an image using the image sensor, automatically moving the first calibration standard using the first actuator portion, and automatically acquiring calibration data from the first calibration standard using the image sensor for each of a plurality of further wavelengths in a range of instrument wavelengths to acquire a sequence including a plurality of images and a plurality of corresponding calibration data sets for detector elements in the two-dimensional array, and means for correcting data for each of the images based on the calibration data acquired for the wavelength used to acquire that image to generate a calibrated hyperspectral sample image data set that includes corrected data for the images at the different wavelengths.

2. The apparatus of claim 1 further including a second calibration standard having a second set of optical properties different from the first set of optical properties, and a second actuator portion operatively connected to the second calibration standard and operative to move the second calibration standard in and out of a field of view of the spectrometric instrument.

3. The apparatus of claim 2 further including a support element to which the first and second calibration standards are connected, and wherein the first and second actuator portions are part of a common actuator that is operative to move the support element.

4. The apparatus of claim 3 wherein the support element bears the first and second calibration standards at different radial positions about an axis of rotation and wherein the actuator is a motor operative to rotate the support element about the axis of rotation.

5. The apparatus of claim 3 wherein the support element bears the first and second calibration standards at different linear positions along a first translation direction and wherein the actuator is a linear actuator operative to move the support element along the first translation direction.

6. The apparatus of claim 3 wherein the support element further includes an opening and wherein the actuator is operative to move the opening into the field of view of the imaging spectrometric instrument.

7. The apparatus of claim 3 further including a removable coupling mechanism between the support element and the actuator to allow for replacement of the support element with further, different support elements.

8. The apparatus of claim 7 further including a machine-readable identifier on the support element, the first calibration standard, or the second calibration standard.

9. The apparatus of claim 2 wherein the first calibration standard is a bright reference and wherein the second calibration standard is a dark reference.

10. The apparatus of claim 1 wherein the first actuator portion is operative independent of any movement of a sample in the field of view of the imaging spectrometric instrument.

11. The apparatus of claim 1 further including a further actuator portion operatively connected to a multi-sample holding element.

12. An imaging spectrometric instrument, comprising:
an imaging detector,
a first calibration standard having a first set of optical properties,
a first actuator portion operatively connected to the first calibration standard and operative to move the first calibration standard between the imaging detector and a sample,
sequencing means including means for performing steps of automatically acquiring an image using the imaging detector, automatically moving the first calibration standard using the first actuator portion, and automatically acquiring calibration data from the first calibration standard using the imaging detector for a first wavelength, wherein the sequencing means also includes means for repeating the steps of automatically acquiring an image using the image sensor, automatically moving the first calibration standard using the first actuator portion, and automatically acquiring calibration data from the first calibration standard using the image sensor for each of a plurality of further wavelengths in a range of instruments wavelengths, to acquire a sequence including a plurality of images and a plurality of corresponding calibration data sets for the imaging detector, and means for correcting data for each of the images based on the calibration data acquired for the wavelength used to acquire that image to generate a calibrated hyperspectral sample image data set that includes corrected data for the images at the different wavelengths.

13. The apparatus of claim 12 wherein the imaging detector is a detector that is sensitive to infrared wavelengths.

14. The apparatus of claim 12 wherein the imaging detector is a detector that is sensitive to visible wavelengths.

15. The apparatus of claim 12 wherein the imaging detector is a detector that is sensitive to ultraviolet wavelengths.

16. A method of acquiring a calibrated hyperspectral image data set for a sample using an imaging spectrometric instrument that includes an imaging sensor based on a two-dimensional array of detector elements and storage for the hyperspectral image data set, comprising:
automatically acquiring a first image of a sample at a first wavelength using the two-dimensional array of detector elements,
automatically moving a first calibration standard between the sample and the imaging sensor of the instrument using an actuator,
automatically acquiring calibration data for the detector elements employed to acquire the first image from the first calibration standard after the step of moving the first calibration standard between the sample and the imaging sensor,
automatically moving the calibration standard out from between the sample and the imaging sensor of the instrument using the actuator, after the step of acquiring calibration data,
automatically adjusting an instrument acquisition wavelength from the first wavelength to a second wavelength after the steps of automatically acquiring calibration data and automatically acquiring a first image,
after the steps of automatically acquiring a first image and automatically acquiring calibration data, automatically repeating the steps of automatically acquiring an image, automatically moving a first calibration standard, and automatically acquiring calibration data from the first calibration standard, for at least the second wavelength in a range of instrument wavelengths to acquire a plurality of images and a plurality of corresponding calibration data sets for detector elements in the two-dimensional array, and
correcting data for each of the images based on the calibration data acquired for the wavelength used to acquire that image to generate a calibrated hyperspectral sample image data set that includes corrected data for the images at the different wavelengths, wherein the hyperspectral image data set is stored in the storage.

17. The method of claim 16 further including an initial calibration step before the step of acquiring a first image of the sample.

18. The method of claim 16 further including a further interleaved succession of steps of acquiring images and acquiring calibration data for the sample and wherein the step of generating generates a calibrated hyperspectral data set for the sample from the steps of acquiring a first image, acquiring calibration data, acquiring a second image, automatically repeating, and the further interleaved succession of steps.

19. The method of claim 16 wherein the steps of automatically moving the standard employ a dark reference as the standard.

20. The method of claim 16 wherein the steps of automatically moving the standard employ a bright reference as the standard.

21. The method of claim 16 wherein the steps of moving, acquiring, and generating take place independent of any movement of the sample.

22. The method of claim 16 further including the steps of:
moving a second calibration standard between the sample and the imaging sensor of the instrument after the step of automatically acquiring calibration data for the detector elements employed to acquire the first image,
acquiring calibration data from the second calibration standard after the step of moving the second calibration standard between the sample and the imaging sensor, and
after the steps of automatically acquiring a first image and automatically acquiring calibration data for the detector elements, automatically repeating the steps of automatically moving a second calibration standard and automatically acquiring calibration data from the second calibration standard, for at least the second wavelength in the range of instrument wavelengths to acquire the plurality of images and the plurality of corresponding calibration data sets for detector elements in the two-dimensional array.

23. The method of claim 22 wherein the method employs a dark reference as the first calibration standard and a bright reference as the second calibration standard.

24. The method of claim 22 wherein the method employs an imaging detector that is sensitive to infrared wavelengths.

25. The method of claim 22 wherein the method employs an imaging detector that is sensitive to ultraviolet wavelengths.

26. The method of claim 22 wherein the method employs an imaging detector that is sensitive to visible wavelengths.

27. A calibration standard assembly for an imaging spectrometric instrument that includes two-dimensional image sensing means, comprising:
first calibration means having a first set of optical properties,
means for moving the first calibration means in and out of a field of view of the imaging spectrometric instrument,
sequencing means including means for, a) automatically acquiring an image using the image sensing means, automatically moving the first calibration means using the means for moving, and automatically acquiring calibration data from the first calibration means using the image sensing means, for a first wavelength, wherein the sequencing means also includes means for repeating the steps of automatically acquiring an image using the image sensor, automatically moving the first calibration standard using the first actuator portion, and automatically acquiring calibration data from the first calibration standard using the image sensor for each of a plurality of further wavelengths in a range of instrument wavelengths to acquire a sequence including a plurality of images and a plurality of corresponding calibration data sets for detector elements in the two-dimensional array, and
means for correcting data for each of the images based on the calibration data acquired for the wavelength used to acquire that image to generate a calibrated hyperspectral sample image data set that includes corrected data for the images at the different wavelengths.

* * * * *

UNITED STATES PATENT AND TRADEMARK OFFICE
CERTIFICATE OF CORRECTION

PATENT NO. : 7,414,723 B2
APPLICATION NO. : 11/063051
DATED : August 19, 2008
INVENTOR(S) : E. Neil Lewis et al.

It is certified that error appears in the above-identified patent and that said Letters Patent is hereby corrected as shown below:

At Column 6, Line 62, "each automatically" should read --automatically--
At Column 8, Line 2, "a automatically" should read --automatically--
At Column 8, Line 13 and 14, "instruments" should read --instrument--
At Column 10, Line 18, "for, a) automatically" should read --for automatically--

Signed and Sealed this

Second Day of December, 2008

JON W. DUDAS
*Director of the United States Patent and Trademark Office*